United States Patent [19]

Elting

[11] 3,920,559

[45] Nov. 18, 1975

[54] COMPOSITION AND PROCESS FOR DEFOAMING AQUEOUS DRILLING FLUIDS

[75] Inventor: Katherine Anne Cline Elting, Houston, Tex.

[73] Assignee: Milchem Incorporated, Houston, Tex.

[22] Filed: Feb. 19, 1974

[21] Appl. No.: 443,400

[52] U.S. Cl............ 252/8.5 C; 252/8.5 A; 252/321; 252/358
[51] Int. Cl.² ..................... B01D 19/04; C09K 7/02
[58] Field of Search....... 252/321, 358, 8.5 A, 8.5 C

[56] References Cited
UNITED STATES PATENTS 1,947,725   7/1932   Macarthur et al............. 252/358 X
2,575,298   1/1948   Ryzhar............................... 252/321

OTHER PUBLICATIONS

Chem. Abstracts: Vol. 70, p. 130, paragraph 39449y.

Primary Examiner—Leland A. Sebastian
Assistant Examiner—David Leland
Attorney, Agent, or Firm—William C. Norvell, Jr.

[57] ABSTRACT

A composition and process for defoaming aqueous drilling fluids wherein a synergistic defoamer is produced by the combination of a propylene oxide adduct of oleyl alcohol together with a polyvalent metal salt of stearic acid.

5 Claims, No Drawings

COMPOSITION AND PROCESS FOR DEFOAMING AQUEOUS DRILLING FLUIDS

BACKGROUND OF THE INVENTION

1. Field of the Invention

This invention relates to defoaming agents and is more particularly concerned with the prevention and destruction of foaming of aqueous colloidal dispersions of mineral particles of the clay type such as bentonite.

2. Description of the Prior Art

In drilling wells such as those drilled to produce oil and gas by rotary methods, it is customary to circulate a fluid through the well and around the drill bit during drilling operations. While the fluid circulated may be plain water, aqueous suspensions of solid mineral matter such as clay, bentonite, etc., are more frequently used. These suspensions or muds, as they are generally called, have several recognized functions. They serve to cool and lubricate the bit, to carry drill cuttings and sand to the surface for removal, and to impose a hydrostatic pressure on the drilled earth formations to prevent the flow of fluid therefrom into the well bore.

The presence of foam in drilling mud deleteriously affects the ability of the mud to perform its necessary functions in that it causes a decrease in pump efficiency, alters the rheological properties of the mud so that solids transport and removal is impeded, and reduces the density of the drilling fluid.

With respect to foam structure, two extremes are encountered. The first consists of the liquid phase which is rather viscous, and the foam is in the form of nearly spherical bubbles separated by rather thick liquid films. The other type, which is true foam, contains mostly gas phase, and, structure-wise, consists of gas cells separated by thin films or laminae.

Any agent which changes the surface state of a system from a condition which favors foaming to a condition which does not favor foaming can be classed, strictly speaking, as a defoamer. Differentiation must be made at this point, however, between foam impairment and foam inhibition. Small amounts of nonionic organic liquids such as octanol are frequently used in the drilling industry as defoamers. The octanol appears to function both by excluding the foam producing agent from the surface layer, and, by virtue of its more rapid diffusion to the surface, by reducing the dynamic surface tension. Nevertheless, some coherence of the surface layer still remains, so, although the foam is rendered less stable, its formation is not entirely inhibited. This result is known as foam impairment.

Certain chemical additives, however, are well known to do more than merely impair the stability of foam; these additives can totally inhibit the formation of foam. While these foam inhibitors are always insoluble materials, usually liquids, not every insoluble material can act as a defoamer on this basis alone. The necessary requirements, however, are readily apparent once the actual mechanism of foam inhibiting action is understood.

The action of a foam-inhibiting agent is believed by those skilled in the art to arise from its ability to spread spontaneously over the surface of the foamy liquid. It is this purely mechanical action of the spreading liquid that ruptures the foam film. In order for this mechanical process to occur, however, certain relations must exist between the various surface and interfacial tensions of the system involved.

Several successive operations are required. First, the droplet of insoluble agent must be admitted to the surface. A factor helpful in promoting this action is a slight difference in densities between the agent and the medium such that a buoyant force directs the agent toward the surface. This alone is insufficient, however, as unless the agent has a relatively low surface tension, too low to be wetted by the foamy medium, the droplets of agent might still be covered by a film of the medium. The surface having been entered, the next operation that is required for a foam-inhibiting agent is for the droplet of agent to spread spontaneously across the surface of the medium. These two criteria met, if the medium is a foam producing liquid and has formed a stable liquid film, the spreading action will destroy it.

In an aqueous solution or dispersion, it is generally some type of dissolved organic material that acts as the profoamer. The optimum defoamer for a given aqueous system will vary with the nature of the medium, depending particularly on the profoamer dissolved therein. Obviously, an all-purpose defoamer for aqueous drilling fluids will represent somewhat of a compromise from the optimum in order to function well in the many different systems in which it is used. Basically, however, what is desired is a balance between the lipophilic and hydrophilic portions of the defoaming agent. The lipophilic portion confers low surface tension; the hydrophilic portion confers low interfacial tension. Completely liphophilic substances are not able to spread as a monolayer on water because their interfacial tension against water is so great. If, however, a substance exhibiting a small degree of hydrophily is added such as a fatty acid or fatty alcohol, the first property to respond is the interfacial tension, which becomes smaller.

It has been known to use stearic acid derivatives as defoamers for aqueous drilling fluids. These materials are readily and commercially available and are comparatively inexpensive. Their surface active properties will provide a significant defoaming of an aqueous drilling fluid. However, use of these derivatives is not entirely satisfactory because, upon agitation of the fluid, foam again will appear. It therefore would be highly desirable to utilize a stearic acid derivative together with an additive that would prevent the recurrence of the foam after the addition to the drilling fluid of the initial defoamer. Such a combination would preferably have a synergistic effect; that is, the combination of the defoamers would inhibit foaming more effectively than either material when utilized by itself.

It is therefore an object of the present invention to provide an improved defoaming composition for use in aqueous drilling fluids.

It is also an object of the present invention to provide a method of inhibiting foaming of aqueous drilling fluids.

It is a further object of the present invention to provide a synergistic defoaming additive for use in aqueous drilling fluids.

Other objects and advantages of the use of the present invention will be readily apparent to those skilled in the art from a reading of the specification and the claims herein.

SUMMARY OF THE INVENTION

The invention utilizes as a synergistic defoaming composition for aqueous drilling fluids the combination of a polyvalent metal salt of stearic acid and propylene oxide adduct of oleyl alcohol.

DESCRIPTION OF THE PREFERRED EMBODIMENTS

The defoaming agent that is the subject of this invention appears to have obtained a workable balance between lipophily and hydrophily in that it performs its defoaming function excellently in a wide variety of aqueous drilling fluids.

It has been discovered that use of a propylene oxide adduct of oleyl alcohol in aqueous drilling fluids is quite compatible with the presence therein of stearic acid derivatives, such as the polyvalent metal salts. The presence of these materials in combination produces a synergistic defoamer that quickly reduces foam upon initial introduction and also will inhibit foaming thereafter when the drilling fluid is agitated, such as by circulation from the pit to the bore hole of the well.

Although many polyvalent metal salts of stearic acid may be utilized, it is preferred to use an aluminum salt. Other salts such as calcium, zinc, iron and the like, also may be used.

The propylene oxide adduct of oleyl alcohol may be made by a number of methods which are known to those skilled in the art. The exact method used to obtain this reactant is not critical to the invention. The mole ratio of propylene oxide to oleyl alcohol may vary considerably, but preferably is about 20-to-1. Suitable for use in the present invention is UCON LO-500, manufactured by and commercially available from Union Carbide Corporation, 270 Park Avenue, New York, New York. Utilized below in the Examples, this material is a 20-to-1 mole ratio adduct of propylene oxide and oleyl alcohol generally having the following physical properties:

| Form: | Colorless clear fluid color, Pt—Co units: 20 | |
|---|---|---|
| Odor: | Bland, typical Density, 25°C., of g./cm³: 0.970 | |
| Water %: | 0.25, maximum | |
| Ash%: | 0.05 | |
| Viscosity: | | |
| Saybolt Universal Seconds at 100°F. 500 | | |
| Brookfield at 25°C cps. 200 | | |
| Solubility % | | |
| Water | Insoluble | |
| Alcohol (200 proof) | Complete | |
| Acetone | Complete | |
| Mineral Oil | Approx. 15 | |
| Castor Oil | Complete | |
| Oleic Acid | Complete | |

The ratio of polyvalent metal salt of stearic acid and adduct will vary considerably, depending on many factors. For example, the selected and particular polyvalent metal salt in combination with the adduct may cause a variance in the mole ratio of reactants. When aluminum stearate is used, our testing has indicated that about a 1-to-4 ratio of aluminum stearate to adduct will be sufficient for normal defoaming operations. However, a lower or higher ratio may be utilized when warranted by the particular application.

The synergistic defoamer as above described generally is formulated in a small amount of water, preferably warm or hot, in order to facilitate the blending. Thereafter, the material is placed in an appropriate container for subsequent mixing in the mud pit on location. Alternatively, the polyvalent metal salt of stearic acid and the adduct may be blended in the mud pit by use of a mud gun, or the like.

The amount of defoamer utilized is quite small, thus making its use extremely economical. The treatment amount is measured in parts per million and can be as low as 10 or as high as 5,000. Preferably, satisfactory defoaming will be obtained by using from 150 to 300 p.p.m. of the present defoamer.

The defoamer preferably is pre-blended and added to the drilling fluid at the mud pit. It can, however, be added to the drilling fluid at the flow line either before or after circulation in the well.

The following examples further illustrate the practice of the present invention.

EXAMPLE I

The present example demonstrates the defoaming properties of the defoamer of the present invention. A 1-barrel (42-gallon) equivalent of an aqueous modified polyflavinoid mud was prepared. 5 pounds per barrel equivalent of low molecular weight styrenemaleic anhydride surfactant copolymer was added. The composition was agitated for 15 minutes at high speed on an electric blender. 115 gram samples of the above prepared mud were placed in mixing jars and mixed for 1 minute on an electric mixer at extremely high shear. The agitated samples were then removed from the mixer. One sample (Sample A) was not treated and served as a blank or check. The second sample (Sample B) was treated with 1 drop (approximately 0.05 cc's or 150 p.p.m.) of propylene oxide adduct of oleyl alcohol. The third sample (Sample C) was treated with the equivalent of 1 drop (approximately 0.05 cc's or 150 p.p.m.) of aluminum stearate. The fourth sample (Sample D) was treated with 1 drop (approximately 0.005 cc's or 150 p.p.m.) of a 1-to-4 weight ratio of aluminum stearate and propylene oxide adduct of oleyl alcohol.

The foam produced after agitation was measured after 10 seconds and then 30 seconds. Thereafter, each sample was reagitated on the mixer at high shear for 1 minute and foam height again determined after 2 minutes. The results measured in inches are as follows:

Table I

| Defoamer | Initial Height[1] | | Re-agitated |
|---|---|---|---|
| | 10 Sec. | 30 Sec. | 2 Min. |
| Sample A | 28/16 | 35/16 | 34/16 |
| Sample B | 33/16 | 32/16 | 23/16 |
| Sample C | 35/16 | 35/16 | 30/16 |
| Sample D | 33/16 | 32/16 | 22/16 |

[1]Completely defoamed height = 20/16

EXAMPLE II

After conducting testing in Example I, each sample was reagitated at high shear for 1 minute and poured into a 250 ml. numbered graduate for visual observation of foam height in ml. The results of this test clearly showed the synergistic effect obtained by use of the present invention. The results are indicated below:

Table II

| Sample | Foam Height, ml. |
|---|---|
| A | 188 |
| B | 117 |
| C | 176 |
| D | 100 |

EXAMPLE III

The present example illustrates the compatibility of my defoamer when used in polysaccharide-based drilling fluids. Additionally, this Example clearly shows the improvement of the use of the present defoamer over the prior art octanol defoamer. A potassium chloride-bacterially modified carbohydrate drilling fluid was prepared having a solids content of 25% by volume, a weight of 14.7 pounds per gallon. The fluid contained about 0.025 gallons per barrel of octanol as a defoamer. The fluid was tested as in Example I. Sample A contained the octanol defoamer. Sample B contained aluminum stearate and diesel oil. Sample C contained only the propylene oxide adduct of oleyl alcohol. Sample D contained a 1-to-4 weight ratio of aluminum stearate and propylene oxide adduct of oleyl alcohol. The results are reflected in the following table:

Table III

| | Initial Height (inches) | | Re-agitated Height (inches) | |
|---|---|---|---|---|
| Sample | 10 Sec. | 30 Sec. | 30 Sec. | 2 Minutes |
| A | 30/16 | 28/16 | 28/16 | 26/16 |
| B | 22/16 | 22/16 | 26/16 | 24/16 |
| C | 24/16 | 23/16 | 23/16 | 23/16 |
| D | 23/16 | 21/16 | 22/16 | 22/16 |

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

I claim:

1. A process for inhibiting foaming in an aqueous drilling fluid having a tendency to foam, said process comprising adding to said fluid a foam inhibiting amount of propylene oxide adduct of oleyl alcohol and a polyvalent metal salt of stearic acid, said salt being a member selected from the class consisting of aluminum, calcium, zinc and iron, the mole ratio of propylene oxide to alcohol being about 20-to-1.

2. An aqueous drilling fluid defoamer consisting essentially of a propylene oxide adduct of oleyl alcohol and a polyvalent metal salt of stearic acid, said salt being a member selected from the class consisting of aluminum, calcium, zinc and iron, the mole ratio of propylene oxide to alcohol being about 20-to-1.

3. The process of claim 1 wherein the polyvalent metal salt of stearic acid is aluminum stearate.

4. The defoamer of claim 2 wherein the polyvalent metal salt of stearic acid is aluminum stearate.

5. The process of claim 1 wherein the foam inhibiting amount is from between about 10 and 5,000 p.p.m.

* * * * *